United States Patent
Li et al.

(10) Patent No.: US 11,194,986 B2
(45) Date of Patent: Dec. 7, 2021

(54) FINGERPRINT DETECTION APPARATUS AND TERMINAL DEVICE HAVING FINGERPRINT IDENTIFICATION FUNCTION

(71) Applicant: SHENZHEN GOODIX TECHNOLOGY CO., LTD., Shenzhen (CN)

(72) Inventors: Shunzhan Li, Shenzhen (CN); Wei Zhang, Shenzhen (CN); Xiaogang Qing, Shenzhen (CN)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 5 days.

(21) Appl. No.: 16/714,706

(22) Filed: Dec. 14, 2019

(65) Prior Publication Data
US 2020/0117879 A1    Apr. 16, 2020

Related U.S. Application Data (63) Continuation of application No. PCT/CN2018/110301, filed on Oct. 15, 2018.

(51) Int. Cl.
G06K 9/00 (2006.01)
F21V 8/00 (2006.01)

(52) U.S. Cl.
CPC ......... *G06K 9/00013* (2013.01); *G02B 6/001* (2013.01)

(58) Field of Classification Search
CPC ............ G06K 9/00013; G06K 9/2027; G06K 9/2018; G06K 9/00046; G06K 9/0004; G06K 9/00087; G02B 6/001
See application file for complete search history.

(56) References Cited

U.S. PATENT DOCUMENTS

2017/0193270 A1*  7/2017  Zhang ................ G02F 1/13338
2017/0270339 A1   9/2017  Zou
2017/0316248 A1* 11/2017  He .......................... G01L 1/142

FOREIGN PATENT DOCUMENTS

| CN | 105844233 A | 8/2016 |
| CN | 106229317 A | 12/2016 |
| CN | 107145869 A | 9/2017 |
| CN | 107273808 A | 10/2017 |
| WO | 2018014629 A1 | 1/2018 |

* cited by examiner

*Primary Examiner* — Abhishek Sarma
(74) *Attorney, Agent, or Firm* — Scully Scott Murphy & Presser (57) ABSTRACT

A fingerprint detection apparatus and a terminal device having a fingerprint identification function are disclosed. The terminal device includes: a glass cover, configured to provide a touch interface; a liquid crystal panel, located below the glass cover; a backlight module, located below the liquid crystal panel; and a light-emitting component, located below the glass cover, wherein the light-emitting component and the liquid crystal panel are staggered from each other, and the light-emitting component is configured to emit a light to illuminate the finger to generate a returned light, wherein the returned light is used for the terminal device to perform the fingerprint identification on the finger.

14 Claims, 5 Drawing Sheets

FINGERPRINT DETECTION APPARATUS AND TERMINAL DEVICE HAVING FINGERPRINT IDENTIFICATION FUNCTION

CROSS REFERENCE TO RELATED APPLICATIONS

The present disclosure is a continuation of international application No. PCT/CN2018/110301, filed on Oct. 15, 2018, of which is hereby incorporated by reference in its entirety.

TECHNICAL FIELD

The present application relates to the field of biometric identification, and in particular, to a fingerprint detection apparatus and a terminal device having a fingerprint identification function.

BACKGROUND

In recent years, smartphones have entered a full-screen era. With an increasing screen-to-body ratio of mobile phones, under-screen fingerprint identification technologies have naturally become a trend. Optical under-screen fingerprint technologies take the lead in commercial use. All domestic mainstream mobile phone manufacturers have released types of optical under-screen fingerprint mobile phones. International brand manufacturers are also busy researching and developing new mobile phones with the under-screen fingerprint technologies.

The current optical under-screen fingerprint technologies are all basically applied to an organic light-emitting diode (OLED), an active-matrix organic light-emitting diode (AMOLED) and other self-emitting mobile phone screens. Using a self-emitting screen pixel included in such screens as a light source, a light is illuminated on a finger and reflected by the finger, transmits through a screen and a special optical lens of a mobile phone, and is received by an under-screen sensor, to implement fingerprint image acquisition and fingerprint identification. However, a liquid crystal display (LCD) screen emits a light depending on a backlight module, which may only illuminate a full screen, cannot form an effective fingerprint detection optical loop, and leads to that fingerprint image acquisition and fingerprint identification cannot be implemented, and the optical under-screen fingerprint technologies cannot be applied.

SUMMARY

The present application provides a fingerprint detection apparatus and a terminal device having a fingerprint identification function, which may implement fingerprint identification under an LCD screen.

In a first aspect, a terminal device having a fingerprint identification function is provided. The terminal device includes: a glass cover (110), configured to provide a touch interface for a finger when fingerprint identification is performed; a liquid crystal panel (120), located below the glass cover (110), and configured to display an image; a backlight module (130), located below the liquid crystal panel (120), and configured to provide a light source for the liquid crystal panel (120) to display the image; and a light-emitting component (140), located below the glass cover (110), wherein the light-emitting component (140) and the liquid crystal panel (120) are staggered from each other, and the light-emitting component (140) configured to emit a light to illuminate the finger to generate a returned light, wherein the returned light is used for the terminal device to perform the fingerprint identification on the finger.

Combined with the first aspect, in an implementation manner of the first aspect, the light-emitting component (140) is located at a bottom edge of the liquid crystal panel (120).

Combined with the first aspect and the above implementation manner, in another implementation manner of the first aspect, an angle between a light-emitting plane of the light-emitting component (140) and a surface of the glass cover (110) is not 0°.

Combined with the first aspect and the above implementation manner, in another implementation manner of the first aspect, the angel is filled with an optical adhesive or an optical ramp (142).

Combined with the first aspect and the above implementation manner, in another implementation manner of the first aspect, the angel is larger than 0° and smaller than or equal to 60°.

Combined with the first aspect and the above implementation manner, in another implementation manner of the first aspect, a value of the angel ranges from 30° to 60°.

Combined with the first aspect and the above implementation manner, in another implementation manner of the first aspect, the liquid crystal panel (120) includes: a fingerprint sensing region (121), and the fingerprint sensing region (121) is configured: for the finger to touch for the fingerprint identification, and the returned light generated when the light emitted by the light-emitting component (140) illuminates the finger transmits through the fingerprint sensing region (121).

Combined with the first aspect and the above implementation manner, in another implementation manner of the first aspect, the light-emitting component (140) includes at least one infrared lamp (141).

Combined with the first aspect and the above implementation manner, in another implementation manner of the first aspect, a light-emitting wavelength of each infrared lamp of the at least one infrared lamp ranges from 760 nm to 1000 nm.

Combined with the first aspect and the above implementation manner, in another implementation manner of the first aspect, the light-emitting wavelength of each infrared lamp is 850 nm or 940 nm.

Combined with the first aspect and the above implementation manner, in another implementation manner of the first aspect, the light-emitting component (140) includes two sets of infrared lamps, and distances from the two sets of infrared lamps to a center of the fingerprint sensing region (121) are equal.

Combined with the first aspect and the above implementation manner, in another implementation manner of the first aspect, the terminal device further includes: a first driving unit, and the first driving unit is configured to: control the light-emitting component (140) to emit a light.

Combined with the first aspect and the above implementation manner, in another implementation manner of the first aspect, the first driving unit is configured to: control the light-emitting component (140) to emit the light, by applying a manner of direct current or pulse driving.

Combined with the first aspect and the above implementation manner, in another implementation manner of the first aspect, the terminal device further includes: a breathing lamp component (150), and the breathing lamp component (150) is located below the glass cover (110) and located at the bottom edge of the liquid crystal panel (120), the breathing lamp component (150) and the liquid crystal panel (120) are staggered from each other.

Combined with the first aspect and the above implementation manner, in another implementation manner of the first aspect, the breathing lamp (150) includes: at least one visible light lamp (151) and a light guide bar (152), and the light guide bar (152) is attached below the glass cover (110), to conduct a light of the at least one visible light lamp (151).

Combined with the first aspect and the above implementation manner, in another implementation manner of the first aspect, the at least one visible light lamp (151) are two visible lights, and the two visible lights are located at two ends of the light guide bar (152).

Combined with the first aspect and the above implementation manner, in another implementation manner of the first aspect, the terminal device further includes: a second driving unit, and the second driving unit is configured to: control the breathing lamp component (150) to flash in a cycle according to a duty cycle under a target condition.

Combined with the first aspect and the above implementation manner, in another implementation manner of the first aspect, the second driving unit is configured to: control the breathing lamp component (150) to flash in the cycle according to the duty cycle under the target condition, by applying a manner of pulse width modulated (PWM) driving.

Combined with the first aspect and the above implementation manner, in another implementation manner of the first aspect, in a chronological order the duty cycle sequentially includes: a fade-in phase and a fade-out phase.

In the fade-in phase, luminance of the breathing lamp component (150) increases over time; and in the fade-out phase, the luminance of the breathing lamp component (150) decreases over time.

Combined with the first aspect and the above implementation manner, in another implementation manner of the first aspect, in a chronological order the duty cycle sequentially includes: a fade-in phase, a constant-light phase, a fade-out phase and a constant-dark phase.

In the fade-in phase, the luminance of the breathing lamp component (150) increases over time; in the constant-light phase, the luminance of the breathing lamp component (150) does not change over time and the luminance is large; in the fade-out phase, the luminance of the breathing lamp component (150) decreases over time; in the constant-dark phase, the luminance of the breathing lamp component (150) does not change over time and the luminance is small; and the luminance of the breathing lamp component (150) is larger in the constant-light phase than in the constant-dark phase.

Combined with the first aspect and the above implementation manner, in another implementation manner of the first aspect, the fade-in phase and the fade-out phase have an equal duration; and the constant-light phase and the constant-dark phase have an equal duration.

Combined with the first aspect and the above implementation manner, in another implementation manner of the first aspect, a duty ratio of the fade-in phase linearly increases in a plurality of gears, and a duty ratio of the fade-out phase linearly increases in a plurality of gears.

Combined with the first aspect and the above implementation manner, in another implementation manner of the first aspect, the duty ratio of the fade-in phase linearly increases in 16 gears, and the duty ratio of the fade-out phase linearly increases in 16 gears.

Combined with the first aspect and the above implementation manner, in another implementation manner of the first aspect, the terminal device further includes: a fingerprint identification module (160), configured to receive the returned light, and perform the fingerprint identification on the finger according to the returned light.

Combined with the first aspect and the above implementation manner, in another implementation manner of the first aspect, the fingerprint identification module (160) is located below the backlight module (130).

Thus, the terminal device having a fingerprint identification function of an embodiment of the present application provides a light source for fingerprint identification under the LCD screen, by disposing the light-emitting component under the glass cover, such as disposing an infrared lamp, to solve the problem of fingerprint illumination under the LCD screen, which enables an LCD display to illuminate in a partial area; that is, displaying in a partial area may be implemented without lighting an LCD backlight module; and in addition, the terminal device may further include a breathing lamp structure having a light guide bar, and the light guide bar may enhance an effect of the breathing lamp and implement an effect of a linear/plane breathing lamp.

In a second aspect, a fingerprint identification apparatus is provided, which is applied to a liquid crystal display screen having a glass cover and a liquid crystal panel; and the fingerprint identification apparatus includes: a light-emitting component, configured to be located below the glass cover, wherein the light-emitting component and the liquid crystal panel are staggered from each other, and the light-emitting component is configured to illuminate a finger to generate a returned light; and a fingerprint identification module, configured to receive the returned light, and perform the fingerprint identification on the finger according to the returned light.

Combined with the second aspect, in an implementation manner of the second aspect, the light-emitting component is particularly configured to be disposed at a bottom edge of the liquid crystal panel, and has a predetermined angle with a surface of the liquid crystal panel.

Combined with the second aspect and the above implementation manner, in another implementation manner of the second aspect, a value of the predetermined angle between a light-emitting plane of the light-emitting component and a surface of the glass cover ranges from 0° to 60°.

Combined with the second aspect and the above implementation manner, in another implementation manner of the second aspect, the value of the predetermined angle ranges from 30° to 45°.

Combined with the second aspect and the above implementation manner, in another implementation manner of the second aspect, a gap corresponding to the predetermined angel is filled with an optical adhesive or an optical ramp.

Combined with the second aspect and the above implementation manner, in another implementation manner of the second aspect, a fingerprint sensing region of the fingerprint identification apparatus is located at a display region of the liquid crystal panel, and the fingerprint sensing region is configured to provide an interface for the finger to touch for fingerprint identification, wherein the light-emitting component is configured to emit a light to illuminate the finger to make the generated returned light transmit through the fingerprint sensing region.

Combined with the second aspect and the above implementation manner, in another implementation manner of the second aspect, the light-emitting component includes at least one infrared lamp.

Combined with the second aspect and the above implementation manner, in another implementation manner of the second aspect, a light-emitting wavelength of each infrared lamp of the at least one infrared lamp ranges from 760 nm to 1000 nm.

Combined with the second aspect and the above implementation manner, in another implementation manner of the second aspect, the light-emitting wavelength of each infrared lamp is 850 nm or 940 nm.

Combined with the second aspect and the above implementation manner, in another implementation manner of the second aspect, the light-emitting component includes two sets of infrared lamps, and distances from the two sets of infrared lamps to a center of the fingerprint sensing region are equal.

Combined with the second aspect and the above implementation manner, in another implementation manner of the second aspect, it further includes a first driving unit, configured to control the light-emitting component to emit the light, by applying a manner of direct current or pulse driving.

Combined with the second aspect and the above implementation manner, in another implementation manner of the second aspect, it further includes a breathing lamp component, configured to be disposed at the bottom edge below the glass cover wherein the breathing lamp component and the liquid crystal panel are staggered from each other.

Combined with the second aspect and the above implementation manner, in another implementation manner of the second aspect, the breathing lamp component includes at least one visible light lamp and a light guide bar, and the light guide bar is configured to be attached below the glass cover, to conduct a light of the at least one visible light lamp.

Combined with the second aspect and the above implementation manner, in another implementation manner of the second aspect, the at least one visible light lamp are two visible light lamps, and the two visible light lamps are located at two ends of the light guide bar.

Combined with the second aspect and the above implementation manner, in another implementation manner of the second aspect, it further includes a second driving unit, configured to control the breathing lamp component to flash in a cycle according to a duty cycle under a target condition.

Combined with the second aspect and the above implementation manner, in another implementation manner of the second aspect, the second driving unit is configured to control the breathing lamp component to flash in a cycle according to the duty cycle under the target condition, by applying a manner of pulse width modulated driving.

Combined with the second aspect and the above implementation manner, in another implementation manner of the second aspect, in a chronological order the duty cycle sequentially includes a fade-in phase and a fade-out phase.

Combined with the second aspect and the above implementation manner, in another implementation manner of the second aspect, in a chronological order the duty cycle sequentially includes: a fade-in phase, a constant-light phase, a fade-out phase and a constant-dark phase.

Combined with the second aspect and the above implementation manner, in another implementation manner of the second aspect, the fade-in phase and the fade-out phase have an equal duration, and the constant-light phase and the constant-dark phase have an equal duration.

Combined with the second aspect and the above implementation manner, in another implementation manner of the second aspect, a duty ratio of the fade-in phase linearly increases in a plurality of gears, and a duty ratio of the fade-out phase linearly increases in a plurality of gears.

Combined with the second aspect and the above implementation manner, in another implementation manner of the second aspect, the duty ratio of the fade-in phase linearly increases in 16 gears, and the duty ratio of the fade-out phase linearly increases in 16 gears.

DESCRIPTION OF EMBODIMENTS

Technical solutions in embodiments of the present application will be described hereinafter in conjunction with the accompanying drawings.

Figure 1:
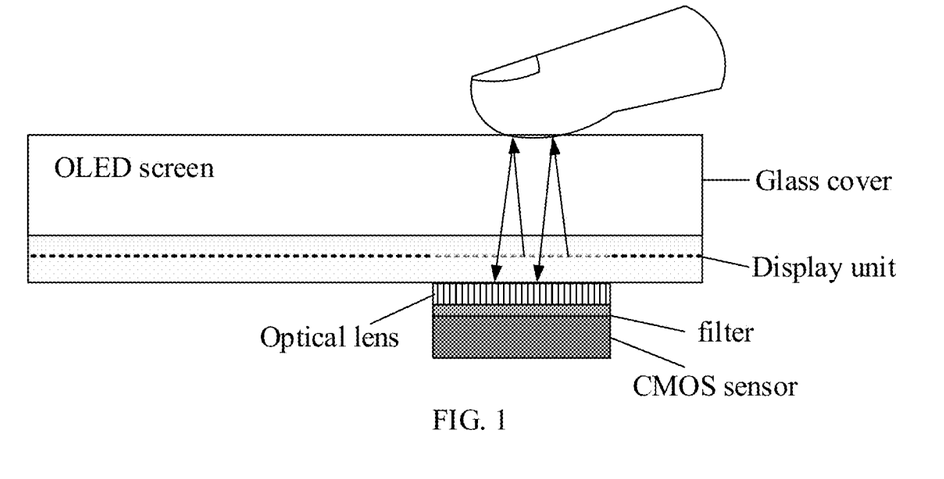
FIG. 1 is a side view of a mobile phone having an OLED/AMOLED and other self-emitting screens.

The current under-screen fingerprint technologies are all basically applied to an OLED/AMOLED and other self-emitting mobile phone screens. Particularly, FIG. 1 shows a side view of a mobile phone having an OLED/AMOLED and other self-emitting screens, wherein the left side of FIG. 1 is a top end of the mobile phone, and the right side is a bottom end. As shown in FIG. 1, an OLED screen includes a display unit, and the display unit is light-emitting pixels that may self-emit light; the light-emitting pixels may be used as a light source; when a finger touches a glass cover on a surface, the light emitted from the light-emitting pixels illuminates on the finger, is reflected by the finger, transmits through a screen and a special optical lens of the mobile phone, and is received by an under-screen sensor through a filter (filter); and for example, the sensor may be a complementary metal-oxide-semiconductor (CMOS) sensor, to implement fingerprint image acquisition and fingerprint identification.

Figure 2:
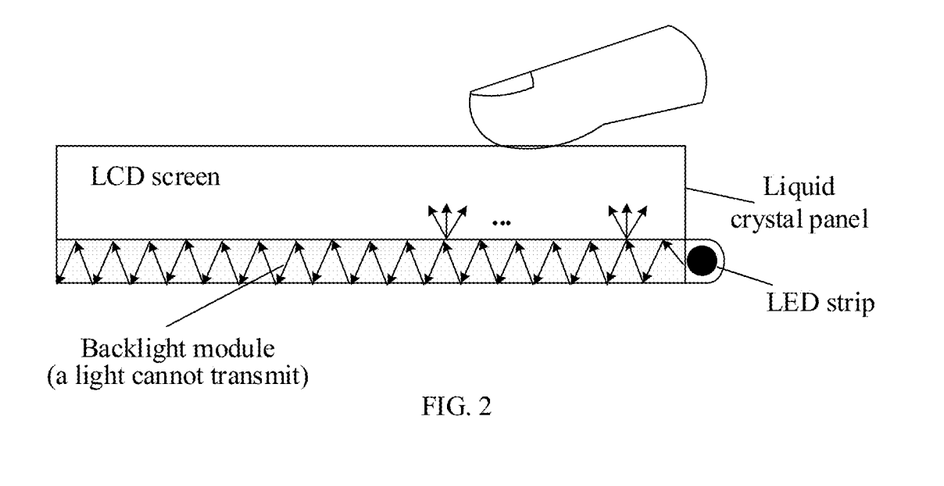
FIG. 2 is a side view of a mobile phone having an LCD screen according to an embodiment of the present application.

Unlike the above OLED/AMOLED and other self-emitting mobile phone screens, an LCD screen cannot self-emit light. Particularly, FIG. 2 shows a side view of a mobile phone having an LCD screen, wherein the left side of FIG. 2 is a top end of the mobile phone, and the right side is a bottom end. As shown in FIG. 2, the LCD screen includes a liquid crystal panel and a backlight module, wherein the backlight module may further include a light emitting diode (LED) strip as in the right side of FIG. 1; the LED strip may provide a light source to the backlight module only; the light is reflected in the backlight module, but cannot penetrate a layer of the backlight module; and the reflected light may illuminate a layer where the liquid crystal panel contacts the backlight module, so that the liquid crystal panel displays an image to present to a user.

However, since the light reflected in the backlight module cannot penetrate the layer of the backlight module, and the light cannot emit partially, it may only illuminate a full screen; and thus, when the finger touches a surface of the liquid crystal panel, an effective fingerprint detection optical loop cannot be formed, an fingerprint image cannot be acquired and fingerprint identification may not be performed.

An embodiment of the present application provides a terminal device having a fingerprint identification function; and the terminal device applies the LCD screen, and may implement fingerprint image acquisition and identification by adding an extra light source.

Figure 3A:
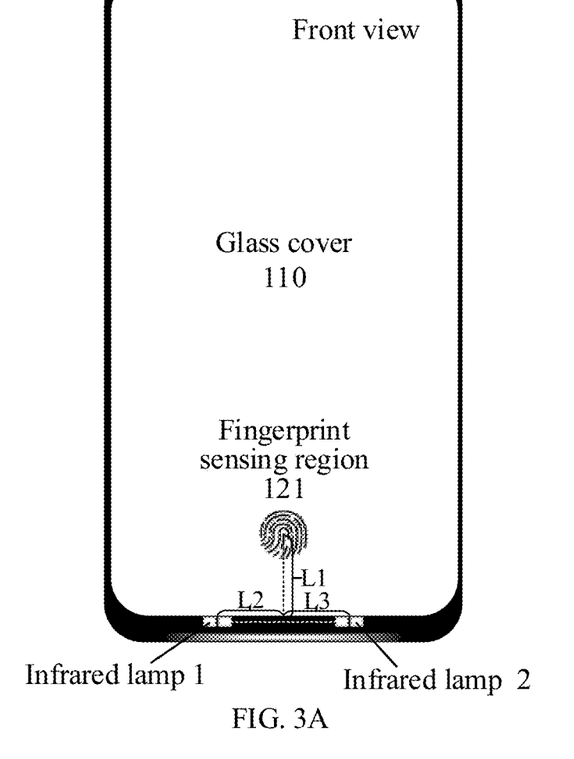
FIGS. 3A and 3B are schematic diagrams of a terminal device having a fingerprint identification function according to an embodiment of the present application.
Figure 3B:
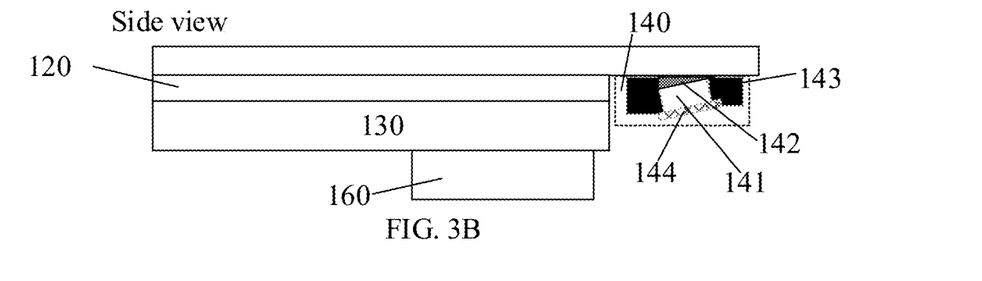

FIGS. 3A and 3B show schematic block diagrams of a terminal device 100 having a fingerprint identification function according to an embodiment of the present application, wherein FIG. 3A is a front view of the terminal device 100, and the FIG. 3B is a side view of the terminal device 100, wherein the left side of the FIG. 3B corresponds to the top end of the terminal device 100 shown in the FIG. 3A, and the right side of the FIG. 3B corresponds to the bottom end of the terminal device 100 shown in the FIG. 3A. As shown in FIGS. 3A and 3B, the terminal device 100 includes: a glass cover 110, a liquid crystal panel 120, a backlight module 130 and a light-emitting component 140.

Particularly, as shown in FIGS. 3A and 3B, the glass cover 110 may be located at the uppermost layer of the terminal device 100 as an operation interface of the terminal device 100, and meanwhile may also be configured to provide a touch interface when fingerprint identification is performed for a finger. The glass cover 110 is a transparent cover; the transparent cover may also be made of other materials, such as a transparent sapphire; and for convenience of illustration, here the glass cover is taken as an example for description.

The liquid crystal panel 120 is located under the glass cover 110 for displaying an image; and the backlight module 130 is located below the liquid crystal panel 120, and configured to provide a light source for the liquid crystal panel 120 to display the image, so that the liquid crystal panel 120 displays the image to the user through the glass cover 110 on a surface.

The light-emitting component 140 is located below the glass cover, the light-emitting component 140 and the liquid crystal panel 120 are staggered from each other; for example, in FIGS. 3A and 3B, the light-emitting component 140 is located at a bottom edge of the liquid crystal panel 120; or, the light-emitting component 140 may also be located in other positions around the liquid crystal panel. The light-emitting component 140 is configured to emit a light to illuminate the finger that touches a surface of the glass cover 110 to generate a returned light, and the returned light is used for the terminal device to perform the fingerprint identification on the finger.

Optionally, the terminal device 100 may further include: a fingerprint identification module 160, configured to receive the returned light, and perform the fingerprint identification on the finger according to the returned light; particularly, the fingerprint identification module 160 generates a fingerprint image according to the returned light, and performs the fingerprint identification on the finger according to the fingerprint image. The fingerprint identification module 160 may be located below the backlight module 130 as shown in FIGS. 3A and 3B, or may also be located in other positions.

It should be understood that for the fingerprint identification module 160 located below the backlight module 130; the backlight module 130 may be processed with an aperture; or the backlight module 130 may be made of a special material, so that the returned light reflected by the finger transmits through the backlight module 130 and is received by the fingerprint identification module 160.

Optionally, as shown in FIG. 3A, the liquid crystal panel 120 may further include: a fingerprint sensing region 121, and the fingerprint sensing region 121 is configured: for the finger to touch for the fingerprint identification; for example, in FIGS. 3A and 3B, the fingerprint sensing region 121 is displayed as a region of a fingerprint shape; or, the fingerprint sensing region 121 may further be a region of other shapes and sizes; the terminal device 100 displays the fingerprint sensing region 121 to a user, so that the user makes the finger that is required to be performed the fingerprint identification touch a range of the fingerprint sensing region 121; and the light emitted by the light-emitting component 140 may transmit through the fingerprint sensing region 121 and illuminate the finger, and meanwhile the returned light generated after the finger is illuminated by the light may transmit through the fingerprint sensing region 121 and transmit downwards, such as transmit to the fingerprint identification module below.

It should be understood that for convenience of illustration, here the light-emitting component 140 is disposed at the bottom edge of the liquid crystal panel as shown in FIGS. 3A and 3B, which is taken as an example for illustration.

Optionally, in order not to affect the liquid crystal panel 120 of the terminal device 100 to display the image, the light-emitting component 140 may apply an invisible light. For example, as shown in FIGS. 3A and 3B, the light-emitting component 140 may include at least one infrared lamp 141; optionally, each infrared lamps 141 may be an LED, and the at least one infrared lamp 141 may be connected in series or in parallel; for example, in FIG. 3, the light-emitting component 140 includes two sets of infrared lamps, respectively located on two sides of the bottom of the terminal device 100; each set of infrared lamps may further include one or more infrared lamps; and for example, in FIGS. 3A and 3B, each set of infrared lamps includes two infrared lamps. Since the infrared lamp emits an invisible light, the infrared lamp does not affect the liquid crystal panel 120 of the terminal device 100 to display the image.

Optionally, a wavelength of each infrared lamp of the at least one infrared lamp 141 may be set to be equal or different; for any one of the infrared lamps, the wavelength of the infrared lamp may range from 760 nm to 1000 nm; for example, 850 nm or 940 nm may be taken; however, the embodiment of the present application is not limited thereto.

Figure 4:
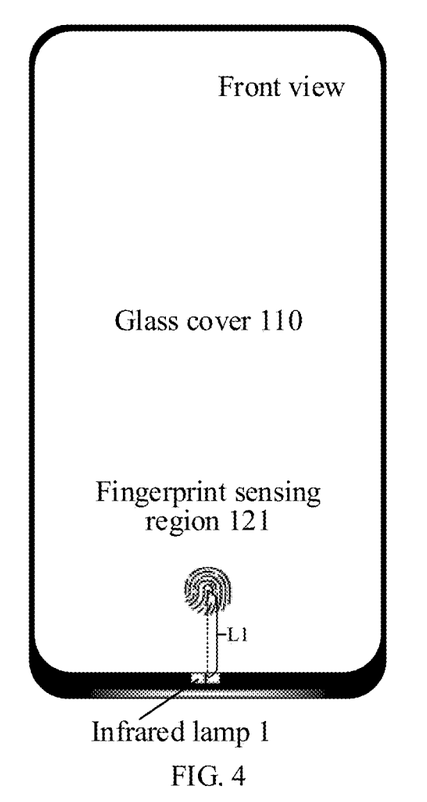
FIG. 4 is another schematic diagram of a terminal device having a fingerprint identification function according to an embodiment of the present application.

Optionally, a position of the at least one infrared lamp 141 included in the light-emitting component 140 may be set according to an actual application. For example, the light-emitting component 140 may include one infrared lamp, and the infrared lamp may be disposed directly below a center of the fingerprint sensing region 121. For another example, the light-emitting component 140 may include two infrared lamps, and the two infrared lamps may be disposed on left and right sides of the bottom end of the terminal device 100; for example, distances from the two infrared lamps to the center of the fingerprint sensing region 121 are set to be equal; or, as shown in FIG. 4, the two infrared lamps are set as FIG. 4; that is, the two infrared lamps are disposed side by side directly below the center of the fingerprint sensing region 121, wherein the distance L1 from the two infrared lamps to the center of the fingerprint sensing region 121 may be set to be any value according to an actual application.

For another example, here take the two sets of infrared lamps as shown in FIGS. 3A and 3B as an example; the two sets of infrared lamps include a total of four infrared lamps; all the four infrared lamps are located at a position of a bottom edge of the terminal device 100 and of the same height; a vertical distance from the four infrared lamps to a central position of the fingerprint sensing region 121 is L1, and horizontal distances from each set of infrared lamps of the two sets of infrared lamps to the central position of the fingerprint sensing region 121 are L2 and L3, respectively; values of the L1, L2, and L3 may be set according to an actual application; for example, 2*L2=2*L3=L1 may be set; and the embodiment of the present application is not limited thereto.

Figure 5:
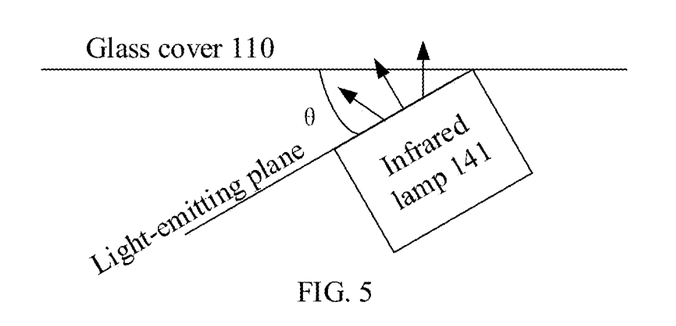
FIG. 5 is a schematic diagram of positions of a light-emitting component and a glass cover according to one embodiment of the present application.

Considering a position with the light-emitting component 140 when fingerprint identification is performed and when the finger touches the glass cover 110 on the surface, an angle between a light-emitting plane of the light-emitting component 140 and a surface of the glass cover 110 is usually set to be greater than 0°, but may also be set to be equal to 0, that is, the light-emitting plane of the light-emitting component 140 and the surface of the glass cover 110 are parallel to each other, which facilitates mounting the light-emitting component 140. Particularly, as shown in FIG. 5, an angle between a surface of a glass cover 110 and a light-emitting plane of a light emitting component 140 is 0, wherein the light-emitting plane of the light-emitting component 140 may be a surface of an infrared lamp 141. In order to ensure that a light of an infrared lamp may illuminate a finger, the angle θ may be taken as any angle less than or equal to 60°, wherein the effect is better, when a value of the angle θ ranges from 30° to 45°.

Optionally, since there may be no air gap between a light-emitting plane of the infrared lamp 141 and the glass cover 110, an angle between the two may be filled with an optical adhesive; or as shown in FIGS. 3A and 3B, an optical ramp 142 is added in the angel; and the embodiment of the present application is not limited thereto.

Optionally, the light-emitting component 140 may further include a shade 143; and for example, as shown in FIGS. 3A and 3B, the shade 143 may be set as a black shade 143. The shade 143 may be configured to shade a light of the infrared lamp 141, so that the light of the infrared lamp 141 better illuminates the finger that touches the plane.

Optionally, the light-emitting component 140 may further include other parts; for example, the light emitting component 140 may further include a flexible printed circuit (FPC) 144; and the FPC 144 may be configured to supply power to the infrared lamp 141 in the light-emitting component.

Figure 6A:
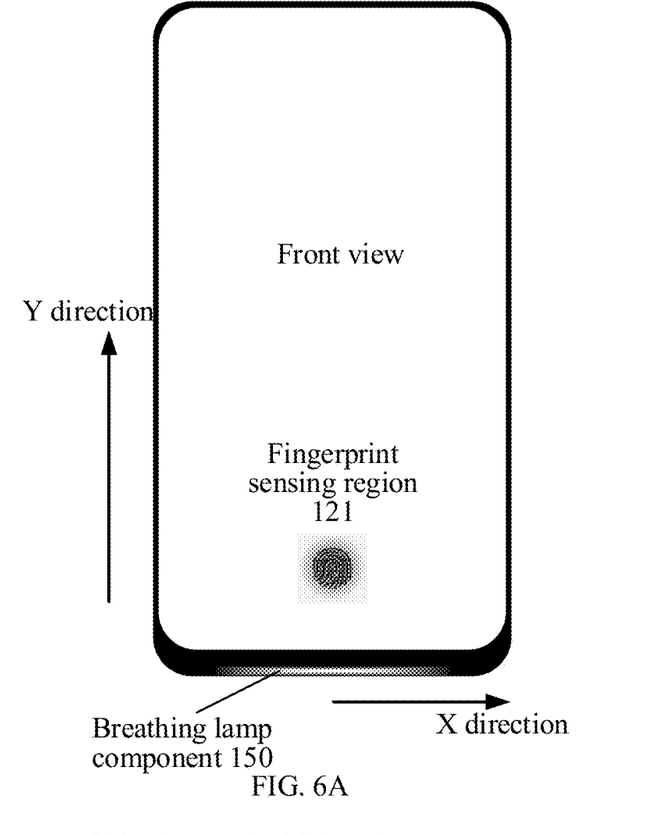
FIGS. 6A and 6B are another schematic diagrams of a terminal device having a fingerprint identification function according to an embodiment of the present application.
Figure 6B:
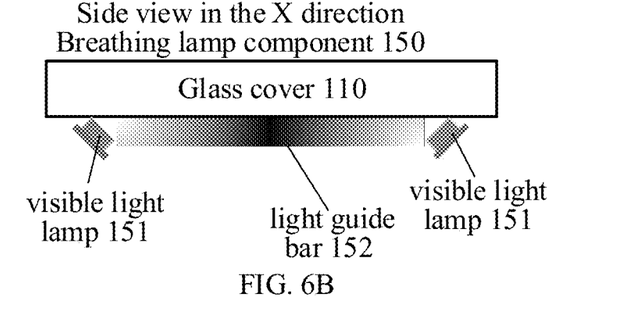

In an embodiment of the present application, FIGS. 6A and 6B show other schematic diagrams of a terminal device 100 having a fingerprint identification function according to an embodiment of the present application, wherein FIG. 6A is a front view of the terminal device 100, and FIG. 6B is a side view of the terminal device 100, wherein as shown in FIG. 6A, the horizontal direction of the terminal device 100 may be referred to as an X direction, and the vertical direction of the terminal device 100 may be referred to as a Y direction; and FIG. 6B is a side view in the X direction; that is, the left side of FIG. 6B corresponds to the left side of the terminal device 100 shown in FIG. 6A, and the right side of FIG. 6B corresponds to the right side of the terminal device 100 shown in FIG. 6A. As shown in FIGS. 6A and 6B, the terminal device 100 may further include: a breathing lamp component 150, and the breathing lamp component 150 is located below a glass cover 110 and located at a bottom edge of a liquid crystal panel 120, the breathing lamp component 150 and the liquid crystal panel 120 are staggered from each other; and for example, a gradient color strip at a lower edge in FIGS. 6A and 6B is the breathing lamp component 150. The breathing lamp 150 may flash and emit according to a duty cycle under a target condition.

The breathing lamp component 150 shown in FIG. 6A has a rectangular strip; and optionally, the breathing lamp component 150 may further be of other shapes. However, considering saving a size of a non-display region of the terminal device 100, for example, in order to enlarge a screen-to-body ratio of a mobile phone, it is space-saving to set the breathing lamp component 150 as the rectangular strip as shown in the upper figure of FIGS. 6A and 6B.

Particularly, take FIGS. 6A and 6B as an example; and as shown in FIG. 6B, the breathing lamp component 150 may include: at least one visible light lamp 151 and a light guide bar 152, and the light guide bar 152 is attached below the glass cover 110, to conduct a light of the at least one visible light lamp 151, to implement a visual effect of changing brightness of a light of the entire strip. For example, considering implementing an gradation effect of left and rights end of the breathing lamp component 150, the at least one visible light lamp 151 may be two visible light lamps, and the two visible lights are located at two ends of the light guide bar 152. Optionally, a light-emitting surface of each visible light lamp may be disposed at an angle other than 0 with a surface of the glass cover 110.

Optionally, similar to the above effect of the breathing lamp component 150, in order to further highlight and display a fingerprint sensing region 121, a breathing lamp component may also be disposed in the fingerprint sensing region 121, and the breathing lamp component and the above breathing lamp component 150 may be set independently from each other. Particularly, a shape of the breathing lamp component at the fingerprint sensing region 121 may be set to be a fingerprint image as shown in FIGS. 3A and 3B; or, as shown in FIGS. 6A and 6B, the breathing lamp component may be set to be a circle, or may be set to be other shapes.

Figure 7:
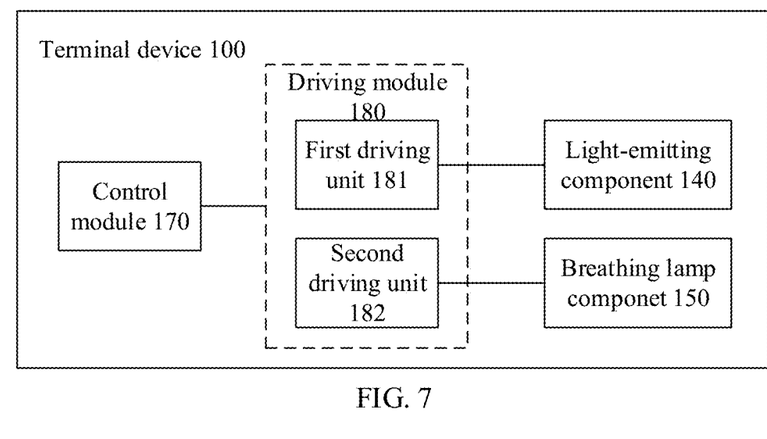
FIG. 7 is another schematic block diagram of a terminal device having a fingerprint identification function according to an embodiment of the present application.

In an embodiment of the present application, the terminal device 100 may further include a control module and a driving module, to control a working state of the light-emitting component 140 and/or the breathing lamp component. Particularly, FIG. 7 shows another schematic block diagram of a terminal device 100 according to an embodiment of the present application; and the terminal device 100 is the terminal device 100 shown in FIGS. 3 and 6. As shown in FIG. 7, the terminal device 100 may further include a driving module 180, and the driving module 180 is configured to control a light-emitting component 140 in the terminal device 100; for example, the driving module 180 may include a first driving unit 181, and the first driving unit 181 is configured to: control the light emitting component 140 to emit a light; and for example, the first driving unit 181 may control the light emitting component 140 to emit the light, by applying a manner of direct current supplying or pulse driving.

Optionally, the first driving unit 181 may control the light-emitting component 140 to remain in a light-emitting state; or, the first driving unit 181 controls the light-emitting component 140 to emit the light when fingerprint identification is required to be performed, and not to emit the light when fingerprint identification is not required; that is, the first driving unit 181 may control the light-emitting component 140 to switch between emitting and not emitting, but the embodiment of the present application is not limited thereto.

Optionally, the driving module 180 may further be configured to control a breathing lamp component in the terminal device 100; for example, the driving module 180 may include a second driving unit 182, and the second driving unit 182 is configured to: control the breathing lamp component 150 to flash in a cycle according to a duty cycle under a target condition; or, the driving module may further include a third driving unit, and the third driving unit is configured to control a breathing lamp component at the fingerprint sensing region 121 of the terminal device. Here, the second driving unit 182 controls the breathing lamp component 150, which is taken as an example for illustration. A process that the third driving unit controls the breathing lamp component at the fingerprint sensing region 121 is similar with it, and details are not described herein again.

It should be understood that the second driving unit 182 may control the breathing lamp component 150 to flash in the cycle according to the duty cycle under the target condition, by applying a manner of direct current supplying or pulse driving; and for example, a manner of pulse width modulation (PWM) outputting may be applied, to control the breathing lamp component 150 to flash.

Figure 8:
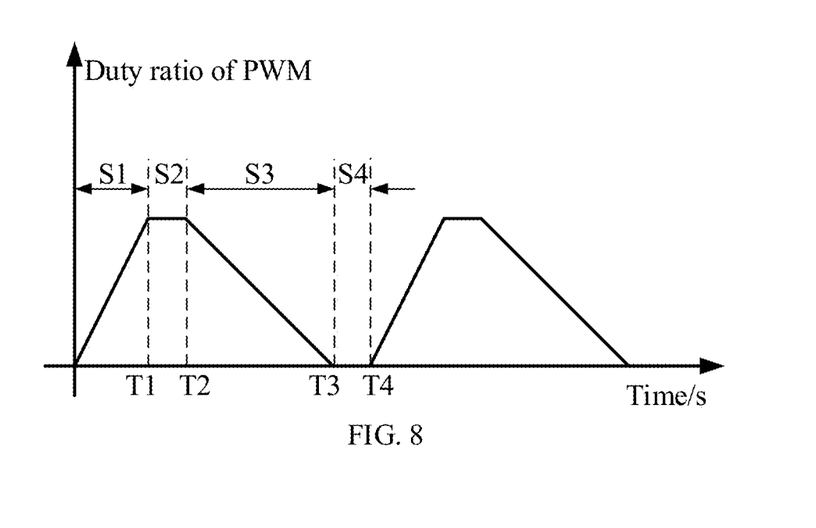
FIG. 8 is a schematic diagram of a duty cycle of a breathing lamp component according to one embodiment of the present application.

Particularly, the breathing lamp component 150 may flash in a cycle according to a preset duty cycle. As shown in FIG. 8, a duty cycle of the breathing lamp component 150 may be divided into four phases, which are a fade-in phase S1, a constant-light phase S2, a fade-out phase S3 and a constant-dark phase S4 respectively, wherein the fade-in phase S1 represents that as time increases, the breathing light component 150 gradually becomes bright; the constant-light phase S2 represents that as the time increases, luminance of the breathing light assembly 150 does not change and remains in a bright state; for example, the luminance may be equal to a maximum value of the fade-in phase S1; the fade-out phase S3 represents that as the time increases, the breathing lamp component 150 gradually becomes dark; the constant-dark phase S4 represents that as the time increases, the luminance of the breathing lamp component 150 does not change and remains in a dark state; and for example, the luminance may be equal to a minimum value of the fade-out phase S3.

Durations of the four phases may be set respectively according to an actual application, wherein the durations of one or more phases of the four phases may be set to be equal to 0, or the durations of a plurality of the phases may be set to be equal; for example, a flashing effect of the breathing lamp component 150 may be considered, to reasonably set the duration of each phase; or, a plurality of durations may be set for each phase so that a user may select according to personal preferences, to set the durations of the breathing lamp component 150 in different phases.

For example, in order to ensure the flashing effect of the breathing lamp component 150, generally durations of the fade-in phase S1 and the fade-out phase S3 are both not set to be zero; and durations of the constant-light phase S2 and the constant-dark phase S4 may be zero. For another example, the durations of the constant-light phase S2 and the constant-dark phase S4 may further not be set to be zero either; or, the durations of the fade-in phase S1 and the fade-out phase S3 may further be set to be equal, meanwhile, the durations of the constant-light phase S2 and the constant-dark phase S4 are also set to be equal; and the embodiment of the present application is not limited thereto.

It should be understood that, as shown in FIG. 8, a second driving unit 182 may control the breathing lamp component 150 in a manner of PWM driving according to the set durations of the fade-in phase S1 and the fade-out phase S3, wherein a duty ratio of the fade-in phase S1 linearly increases in a plurality of gears, and similarly a duty ratio of the fade-out phase linearly increases in a plurality of gears. For example, the duty ratio of the fade-in phase S1 may linearly increase in 16 gears, and the duty ratio of the fade-out phase S3 linearly decreases in 16 gears; or, the number of the gears of the fade-in phase S1 and the fade-out phase S3 may also be set to be different; and the embodiment of the present application is not limited thereto.

It should be understood that each driving unit in the above-mentioned driving module 180 may work independently from each other without affecting each other.

Optionally, the terminal device 100 may further include a control module 170; and the control module 170 controls a working state of the driving module 180 and controls the driving module 180 to work in different driving manners, thereby implementing controlling working states of a light-emitting component 140 and the breathing lamp component 150, and flexibly implementing fingerprint illumination under an LCD screen and control of a breathing lamp.

Particularly, the terminal device 100 may control a working state of the first driving unit 181 by the control module 170; for example, when fingerprint identification is required to be performed, the control module 170 controls the first driving unit 181 to enter the working state, so that the first driving unit 181 controls the light-emitting component 140 to emit a light; and when fingerprint identification is not required, the control module 170 controls the first driving unit 181 to exit the working state, so that the first driving unit 181 controls the light-emitting component 140 not to emit the light.

Optionally, the terminal device 100 may also control a working state of the second driving unit 182 by the control module 170. For example, the control module 170 controls the second driving unit 182 to enter the working state under a target condition, so that the second driving unit 182 controls the breathing light component 150 to flash, wherein the target condition may include: the terminal device 100 receives a message that requires a user to view, such as a notification message of some applications received by the terminal device 100.

For example, the terminal device 100 may be a mobile phone; when the mobile phone receives notification of a short message or notification of other applications, that is, in the case that it is required to prompt the user to view the notification message, the control module 170 may control the second driving unit 182 to start working, so that the second driving unit 182 drives the breathing lamp component 150 to flash, such as flashing in a cycle according to the duty cycle of the breathing lamp component 150, to facilitate the user to view the notification message after seeing the flashing prompt of the breathing lamp.

Optionally, when the user views the notification message, the user may first perform fingerprint identification to unlock the mobile phone, and then the control module 170 controls the first driving unit 181 to work; the first driving unit 181 controls the light-emitting component 140 to emit the light to illuminate a finger that touches a plane, to generate a returned light; and a fingerprint identification module 160 in the mobile phone generates a fingerprint image according to the returned light, thereby performing fingerprint identification; and after the identification is successful, the user may view the notification information.

Thus, the terminal device having a fingerprint identification function of an embodiment of the present application provides a light source for fingerprint identification under the LCD screen, by disposing the light-emitting component under the glass cover, such as disposing an infrared lamp, to solve the problem of fingerprint illumination under the LCD screen, which enables an LCD display to illuminate in a partial area, that is, displaying in a partial area may be implemented without lighting an LCD backlight module; and in addition, the terminal device may further include a breathing lamp structure having a light guide bar, and the light guide bar may enhance an effect of the breathing lamp and implement an effect of a linear/plane breathing lamp. The terminal device of an embodiment of the present application supports a plurality of manners of LED driving, supports automatic PWM duty cycle linear adjustment, supports synchronization of an on-and-off infrared lamp and under-screen fingerprint acquisition, and supports multi-channel LED independent control.

An embodiment of the present application further provides a fingerprint identification apparatus; the fingerprint deification apparatus may be located in the terminal device, and the terminal device includes a liquid crystal display screen having a glass cover and a liquid crystal panel; the fingerprint identification apparatus includes: a light-emitting component, configured to be located below the glass cover, wherein the light-emitting component and the liquid crystal panel are staggered from each other, and the light-emitting component is configured to illuminate a finger to generate a returned light; and a fingerprint identification module, configured to receive the returned light, and perform fingerprint identification on the finger according to the returned light.

It should be understood that the fingerprint identification module in the fingerprint identification apparatus may correspond to the above fingerprint identification module 160, and a light-emitting component included in the fingerprint recognition apparatus may correspond to the above light-emitting assembly 140. In addition, the fingerprint identification apparatus may be located in the terminal device, and the terminal device may correspond to the above terminal device 100, and the glass cover and the liquid crystal panel in the terminal device respectively correspond to the glass cover 110 and the liquid crystal panel 120 in the above terminal device 100. For brevity, details are not described herein.

Optionally, as an embodiment, the light-emitting component is particularly configured to be disposed at a bottom edge of the liquid crystal panel, and a light-emitting plane of the light-emitting component has a predetermined angle with a surface of the liquid crystal panel.

Optionally, as an embodiment, a value of the predetermined angle between the light-emitting plane of the light-emitting component and a surface of the glass cover ranges from 0° to 60°.

Optionally, as an embodiment, the value of the predetermined angle ranges from 30° to 45°.

Optional, as an embodiment, a gap corresponding to the predetermined angel is filled with an optical adhesive or an optical ramp.

Optionally, as an embodiment, a fingerprint sensing region of the fingerprint identification apparatus is located at a display region of the liquid crystal panel, and the fingerprint sensing region is configured to provide an interface for the finger to touch for fingerprint identification, wherein the light-emitting component is configured to emit a light to illuminate the finger to make the generated returned light transmit through the fingerprint sensing region.

It should be understood that the fingerprint sensing region may correspond to the above fingerprint sensing region 121, and details are not described herein again.

Optionally, as an embodiment, the light-emitting component includes at least one infrared lamp.

Optionally, as an embodiment, a light-emitting wavelength of each infrared lamp of the at least one infrared lamp ranges from 760 nm to 1000 nm.

Optionally, as an embodiment, the light-emitting wavelength of each infrared lamp is 850 nm or 940 nm.

Optionally, as an embodiment, the light-emitting component includes two sets of infrared lamps, and distances from the two sets of infrared lamps to a center of the fingerprint sensing region are equal.

Optionally, as an embodiment, it further includes a first driving unit, and the first driving unit is configured to control the light-emitting component to emit the light, by applying a manner of direct current or pulse driving.

Optionally, as an embodiment, it further includes a breathing lamp component, configured to be disposed at the bottom edge below the glass cover, wherein the breathing lamp component and the liquid crystal panel are staggered from each other.

It should be understood that the breathing light component in the fingerprint identification apparatus may correspond to the above breathing lamp component 150, and details are not described herein.

Optionally, as an embodiment, the breathing lamp component includes at least one visible light lamp and a light guide bar, and the light guide bar is configured to be attached below the glass cover, to conduct a light of the at least one visible light lamp.

Optionally, as an embodiment, the at least one visible light lamp are two visible light lamps, and the two visible light lamps are located at two ends of the light guide bar.

Optionally, as an embodiment, it further includes a second driving unit, configured to control the breathing lamp component to flash in a duty cycle under a target condition.

Optionally, as an embodiment, the second driving unit is configured to control the breathing lamp component to flash in a duty cycle under a target condition, by applying a manner of pulse width modulated driving.

Optionally, as an embodiment, in a chronological order the duty cycle sequentially includes: a fade-in phase and a fade-out phase.

Optionally, as an embodiment, in a chronological order the duty cycle sequentially includes: a fade-in phase, a constant-light phase, a fade-out phase and a constant-dark phase.

Optionally, as an embodiment, the fade-in phase and the fade-out phase have an equal duration, and the constant-light phase and the constant-dark phase have an equal duration.

Optionally, as an embodiment, a duty ratio of the fade-in phase linearly increases in a plurality of gears, and a duty ratio of the fade-out phase linearly increases in a plurality of gears.

Optionally, as an embodiment, the duty ratio of the fade-in phase linearly increases in 16 gears, and the duty ratio of the fade-out phase linearly increases in 16 gears.

Those of ordinary skill in the art may be aware that, units and algorithm steps of the examples described in the embodiments disclosed in this paper may be implemented by electronic hardware, computer software, or a combination of the two. Whether these functions are performed by hardware or software depends on particular applications and designed constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that, the disclosed system, apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate components may or may not be physically separate, and components displayed as units may or may not be physical units, may be located in one position, or may be distributed on multiple network units. Part of or all of the units here may be selected according to a practical need to achieve the objectives of the solutions of the embodiments of the present application.

In addition, functional units in the embodiments of the present application may be integrated into a processing unit, or each unit may exist alone physically, or two or more than two units may be integrated into one unit.

When the functions are implemented in the form of a software functional unit and sold or used as an independent product, the functions may be stored in a computer-readable storage medium. Based on such understanding, the technical solution of the present application substantially, or the part of the present application making contribution to the prior art, or a part of the technical solution may be embodied in the form of a software product, and the computer software product is stored in a storage medium, which includes multiple instructions enabling computer equipment (which may be a personal computer, a server, network equipment or the like) to execute all of or part of the steps in the methods of the embodiments of the present application. The foregoing storage medium includes a variety of media capable of storing program codes, such as a USB disk, a mobile hard disk, a read-only memory (ROM), a random access memory (RAM), a magnetic disk, an optical disk.

The foregoing descriptions are merely specific embodiments of the present application, but the protection scope of the present application is not limited thereto, persons skilled in the art who are familiar with the art could readily think of variations or substitutions within the technical scope disclosed by the present application, and these variations or substitutions shall fall within the protection scope of the present application. Therefore, the protection scope of the present application shall be subject to the protection scope of the claims.

What is claimed is:

1. A terminal device having a fingerprint identification function, comprising:
    a glass cover, configured to provide a touch interface;
    a liquid crystal panel, located below the glass cover, and configured to display an image;
    a backlight module, located below the liquid crystal panel, and configured to provide a light source for the liquid crystal panel to display the image;
    a light-emitting component, located below the glass cover, wherein the light-emitting component and the liquid crystal panel are non-overlapping from each other, and the light-emitting component is configured to emit a light to illuminate the finger to generate a returned light, wherein the returned light is used for the terminal device to perform the fingerprint identification on the finger; and
    a fingerprint identification module, located below the backlight module and configured to receive the returned light, and perform the fingerprint identification on the finger according to the returned light;
    a breathing lamp component, the breathing lamp component is located below the glass cover and located at a bottom edge of the liquid crystal panel, and the breathing lamp component and the liquid crystal panel are non-overlapping from each other,
    wherein the breathing lamp component comprises: at least one visible light lamp and a light guide bar, and the light guide bar is attached below the glass cover, to conduct a light emitted from the at least one visible light lamp, the breathing lamp comprises at least two working states which is selected from a fade-in phase, a constant-light phase, a fade-out phase and a constant-dark phase.

2. The terminal device according to claim 1, wherein the light-emitting component is located at a bottom edge of the liquid crystal panel.

3. The terminal device according to claim 1, wherein a value of an angle between a light-emitting plane of the light-emitting component and a surface of the glass cover ranges from 0° to 60°.

4. The terminal device according to claim 3, wherein the value of the angle ranges from 30° to 45°.

5. The terminal device according to claim 1, wherein the light-emitting component comprises at least one infrared lamp.

6. The terminal device according to claim 1, wherein the terminal device further comprises: a first driving unit, and the first driving unit is configured to control the light-emitting component to emit a light by applying a manner of direct current or pulse driving.

7. The terminal device according to claim 1, wherein the terminal device further comprises: a second driving unit, and the second driving unit is configured to control the breathing lamp component to flash periodically in a cycle according to a duty cycle under a target condition.

8. The terminal device according to claim 7, wherein the second driving unit is configured to:
    control the breathing lamp component to flash periodically by applying a manner of pulse width modulated (PWM) driving.

9. A fingerprint identification apparatus, applied to a liquid crystal display screen having a glass cover, a liquid crystal panel and a backlight module, wherein the liquid crystal panel is located below the glass cover and the backlight module is located below the liquid crystal panel, wherein the fingerprint identification apparatus comprises:
    a light-emitting component, configured to be located below the glass cover, wherein the light-emitting component and the liquid crystal panel are non-overlapping from each other, and the light-emitting component is configured to illuminate a finger to generate a returned light; and a fingerprint identification module, located below the backlight module and configured to receive the returned light, and perform the fingerprint identification on the finger according to the returned light;

a breathing lamp component, configured to be disposed at a bottom edge of the liquid crystal panel below the glass cover, wherein the breathing lamp component and the liquid crystal panel are non-overlapping from each other;

wherein the breathing lamp component comprises at least one visible light lamp and a light guide bar, and the light guide bar is configured to be attached below the glass cover, to conduct a light emitted from the at least one visible light lamp, the breathing lamp comprises at least two working states which is selected from a fade-in phase, a constant-light phase, a fade-out phase and a constant-dark phase.

10. The fingerprint identification apparatus according to claim 9, wherein the light-emitting component is particularly configured to be disposed at a bottom edge of the liquid crystal panel, and a predetermined angle between a light-emitting plane of the light-emitting component and a surface of the glass cover ranges from 0° to 60°.

11. The fingerprint identification apparatus according to claim 10, wherein the value of the predetermined angle ranges from 30° to 45°.

12. The fingerprint identification apparatus according to claim 9, wherein the light-emitting component comprises at least one infrared lamp.

13. The fingerprint identification apparatus according to claim 9, further comprising a first driving unit, configured to control the light-emitting component to emit the light by applying a manner of direct current or pulse driving.

14. The fingerprint identification apparatus according to claim 9, further comprising a second driving unit, configured to control the breathing lamp component to flash periodically by applying a manner of pulse width modulated driving.

* * * * *